United States Patent
Plowman et al.

(10) Patent No.: US 8,553,109 B2
(45) Date of Patent: Oct. 8, 2013

(54) CONCURRENT IMAGE PROCESSING FOR GENERATING AN OUTPUT IMAGE

(75) Inventors: David Plowman, Great Chesterfield (GB); Naushir Patuck, Cambridge (GB); Benjamin Sewell, Truro (GB); Graham Veitch, Cambridge (GB)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/431,064

(22) Filed: Mar. 27, 2012

(65) Prior Publication Data

US 2013/0021505 A1   Jan. 24, 2013

Related U.S. Application Data

(63) Continuation-in-part of application No. 13/235,975, filed on Sep. 19, 2011, now abandoned.

(60) Provisional application No. 61/509,747, filed on Jul. 20, 2011, provisional application No. 61/509,797, filed on Jul. 20, 2011.

(51) Int. Cl.
*H04N 5/217*   (2011.01)
*G06F 1/20*   (2006.01)
*G06K 9/60*   (2006.01)

(52) U.S. Cl.
USPC ........ 348/241; 348/222.1; 348/262; 345/505; 345/506; 382/303; 382/304

(58) Field of Classification Search
USPC ............... 348/222.1, 332, 241; 382/333, 304; 345/501–506
See application file for complete search history.

(56) References Cited

U.S. PATENT DOCUMENTS

| | | | |
|---|---|---|---|
| 6,111,596 A * | 8/2000 | Haskell et al. | 348/42 |
| 2008/0024596 A1 * | 1/2008 | Li et al. | 348/47 |
| 2008/0030592 A1 * | 2/2008 | Border et al. | 348/218.1 |
| 2008/0050046 A1 * | 2/2008 | Kim | 382/303 |
| 2008/0218611 A1 * | 9/2008 | Parulski et al. | 348/262 |
| 2010/0231743 A1 * | 9/2010 | Choi et al. | 348/222.1 |
| 2010/0271498 A1 * | 10/2010 | Hwang et al. | 348/222.1 |
| 2011/0267508 A1 * | 11/2011 | Kane et al. | 348/241 |
| 2011/0310274 A1 * | 12/2011 | Kuriyama | 348/231.99 |

* cited by examiner

*Primary Examiner* — Roberto Velez
*Assistant Examiner* — Quan Pham
(74) *Attorney, Agent, or Firm* — Thomas | Horstemeyer, LLP

(57) ABSTRACT

Embodiments of the present application automatically utilize parallel image captures in an image processing pipeline. In one embodiment, image processing circuitry concurrently receives first image data to be processed and second image data to be processed, wherein the second image data is processed to aid in enhancement of the first image data.

26 Claims, 17 Drawing Sheets

CONCURRENT IMAGE PROCESSING FOR GENERATING AN OUTPUT IMAGE

CROSS-REFERENCE TO RELATED APPLICATION

This application is a continuation-in-part of copending U.S. utility application entitled, "Multiple Image Processing," having Ser. No. 13/235,975, filed Sep. 19, 2011, which is entirely incorporated herein by reference. The application having Ser. No. 13/235,975 claims priority to U.S. provisional application entitled, "Image Capture Device Systems and Methods," having Ser. No. 61/509,747, filed Jul. 20, 2011, which is entirely incorporated herein by reference.

This application also claims benefit of U.S. provisional application entitled "Multimedia Processing" having Ser. No. 61/509,797, filed Jul. 20, 2011, the entirety of which is hereby incorporated by reference.

BACKGROUND

With current cameras, there is a significant delay between the capture of an image and the subsequent display of a framed image to the user via a viewfinder. Accordingly, advances in image processing may allow for improvements, such as shorter latency.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

This disclosure pertains to a device, method, computer useable medium, and processor programmed to automatically utilize parallel image captures in an image processing pipeline in a digital camera, digital video camera, or other imaging device. One of ordinary skill in the art would recognize that the techniques disclosed may also be applied to other contexts and applications as well.

For cameras in embedded devices, e.g., digital cameras, digital video cameras, mobile phones, personal data assistants (PDAs), tablets, portable music players, and desktop or laptop computers, to produce more visually pleasing images, techniques such as those disclosed herein can improve image quality without incurring significant computational overhead or power costs.

To acquire image data, a digital imaging device may include an image sensor that provides a number of light-detecting elements (e.g., photodetectors) configured to convert light detected by the image sensor into an electrical signal. An image sensor may also include a color filter array that filters light captured by the image sensor to capture color information. The image data captured by the image sensor may then be processed by an image processing pipeline circuitry, which may apply a number of various image processing operations to the image data to generate a full color image that may be displayed for viewing on a display device, such as a monitor.

Figure 1:
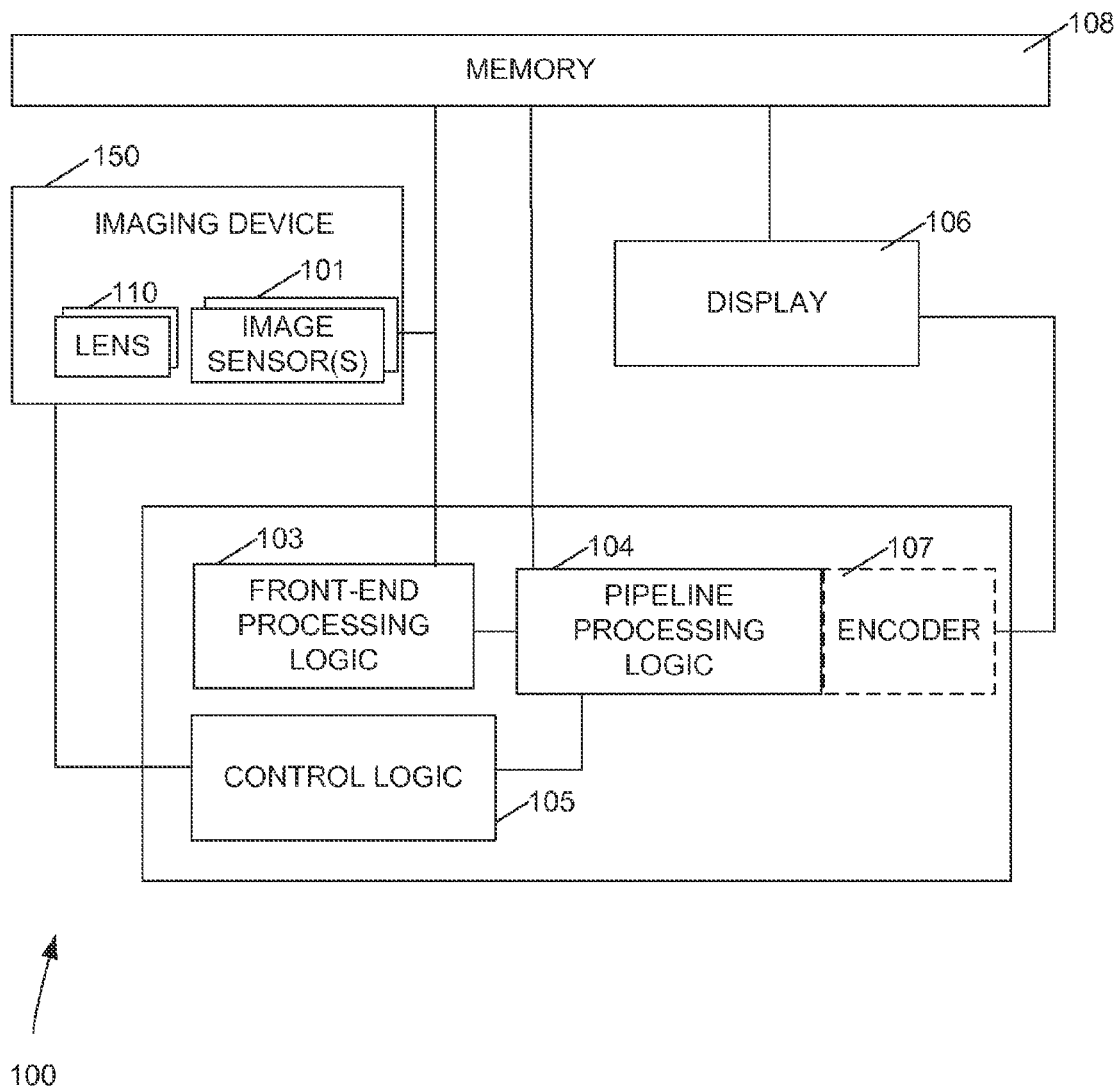
FIG. 1 is a block diagram of one embodiment of an image processing circuitry according to the present disclosure.

Referring to FIG. 1, a block diagram of one embodiment of an image processing circuitry 100 is shown for an imaging device 150. The illustrated imaging device 150 may be provided as a digital camera configured to acquire both still images and moving images (e.g., video). The device 150 may include lens(es) 110 and one or more image sensors 101 configured to capture and convert light into electrical signals. By way of example only, the image sensor may include a CMOS (complementary metal-oxide-semiconductor) image sensor (e.g., a CMOS active-pixel sensor (APS)) or a CCD (charge-coupled device) sensor.

In some embodiments, the image processing circuitry 100 may include various subcomponents and/or discrete units of logic that collectively form an image processing "pipeline" for performing each of the various image processing steps. These subcomponents may be implemented using hardware (e.g., digital signal processors or ASICs (application-specific integrated circuits)) or software, or via a combination of hardware and software components. The various image processing operations may be provided by the image processing circuitry 100.

The image processing circuitry 100 may include front-end processing logic 103, pipeline processing logic 104, and control logic 105, among others. The image sensor(s) 101 may include a color filter array (e.g., a Bayer filter) and may thus provide both light intensity and wavelength information captured by each imaging pixel of the image sensors 101 to provide for a set of raw image data that may be processed by the front-end processing logic 103.

In some embodiments, a single lens 110 and a single image sensor 101 may be employed in the image processing circuitry. While in other embodiments, multiple lenses 110 and multiple image sensors 101 may be employed, such as for a stereoscopy uses, among others.

The front-end processing logic 103 may also receive pixel data from memory 108. For instance, the raw pixel data may be sent to memory 108 from the image sensor 101. The raw pixel data residing in the memory 108 may then be provided to the front-end processing logic 103 for processing.

Upon receiving the raw image data (from image sensor 101 or from memory 108), the front-end processing logic 103 may perform one or more image processing operations. The processed image data may then be provided to the pipeline processing logic 104 for additional processing prior to being displayed (e.g., on display device 106), or may be sent to the memory 108. The pipeline processing logic 104 receives the "front-end" processed data, either directly from the front-end processing logic 103 or from memory 108, and may provide for additional processing of the image data in the raw domain, as well as in the RGB and YCbCr color spaces, as the case may be. Image data processed by the pipeline processing logic 104 may then be output to the display 106 (or viewfinder) for viewing by a user and/or may be further processed by a graphics engine. Additionally, output from the pipeline processing logic 104 may be sent to memory 108 and the display 106 may read the image data from memory 108. Further, in some implementations, the pipeline processing logic 104 may also include encoder(s) 107, such as a compression engine, for encoding the image data prior to being read by the display 106. The pipeline processing logic 104 may also include decoder(s) for decoding bitstreams or other multimedia data that are received by the imaging device 150.

The encoder 107 may be a JPEG (Joint Photographic Experts Group) compression engine for encoding still images, or an H.264 compression engine for encoding video images, or some combination thereof. Also, it should be noted that the pipeline processing logic 104 may also receive raw image data from the memory 108.

The control logic 105 may include a processor 820 (FIG. 8) and/or microcontroller configured to execute one or more routines (e.g., firmware) that may be configured to determine control parameters for the imaging device 150, as well as control parameters for the pipeline processing logic 104. By way of example only, the control parameters may include sensor control parameters, camera flash control parameters, lens control parameters (e.g., focal length for focusing or zoom), or a combination of such parameters for the image sensor(s) 101. The control parameters may also include image processing commands, such as autowhite balance, autofocus, autoexposure, and color adjustments, as well as lens shading correction parameters for the pipeline processing logic 104. The control parameters may further comprise multiplexing signals or commands for the pipeline processing logic 104.

Figure 2:
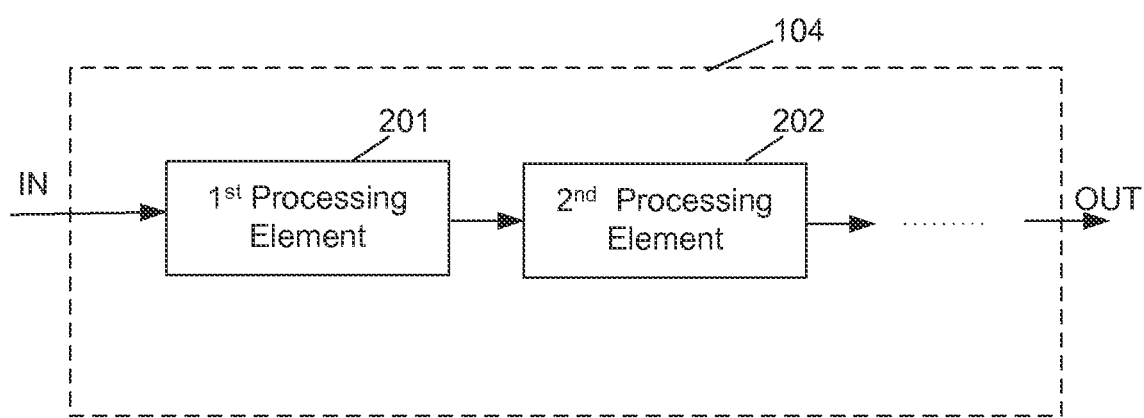
FIGS. 2-7 are block diagrams of embodiments of an image signal processing pipeline implemented by the pipeline processing logic from the image processing circuitry of FIG. 1.
Figure 8:
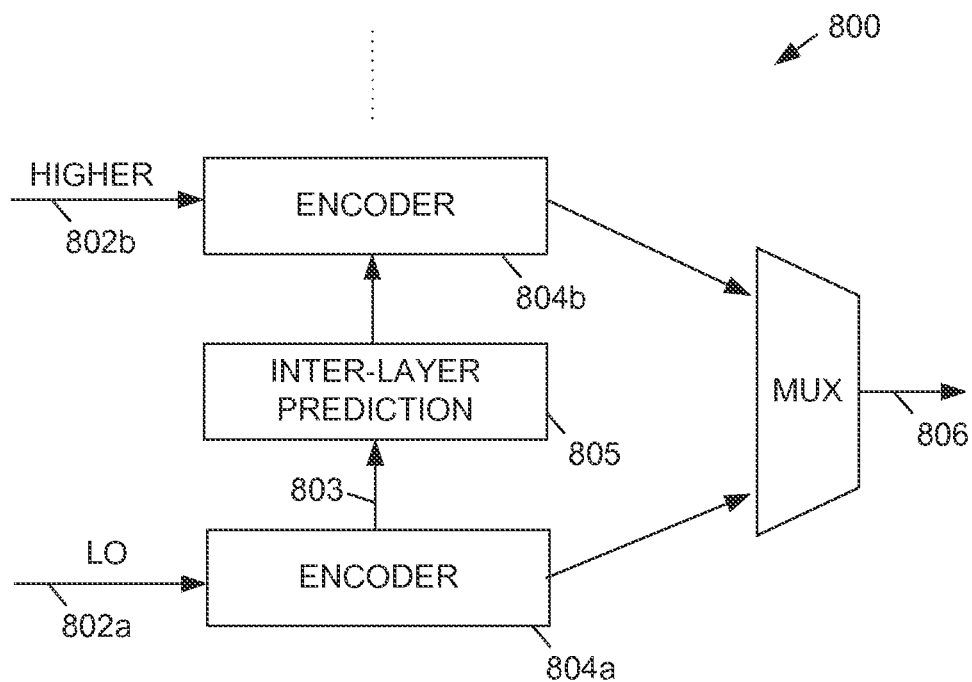
FIGS. 8-9 are block diagrams of embodiments of encoding and decoding architectures implemented by the pipeline processing logic from the image processing circuitry of FIG. 1.

Referring now to FIG. 2, one embodiment of the pipeline processing logic 104 may perform processes of an image signal processing pipeline by first sending image information to a first process element 201 which may take the raw data produced by the image sensor 101 (FIG. 1) and generate a digital image that will be viewed by a user or undergo further processing by a downstream process element. Accordingly, the image signal processing pipeline may be considered as a series of specialized algorithms that adjusts image data in real-time and is often implemented as an integrated component of a system-on-chip (SoC) image processor. With an image signal processing pipeline implemented in hardware, front-end image processing can be completed without placing any processing burden on the main application processor 820 (FIG. 8).

In one embodiment, the first process element 201 of an image signal processing pipeline could perform a particular image process such as noise reduction, defective pixel detection/correction, lens shading correction, lens distortion correction, demosaicing, image sharpening, color uniformity, RGB (red, green, blue) contrast, saturation boost process, etc. As discussed above, the pipeline may include a second process element 202. In one embodiment, the second process element 202 could perform a particular and different image process such as noise reduction, defective pixel detection/correction, lens shading correction, demosaicing, image sharpening, color uniformity, RGB contrast, saturation boost process etc. The image data may then be sent to additional element(s) of the pipeline as the case may be, saved to memory 108 (FIG. 1), and/or input for display 106 (FIG. 1).

Figure 3:
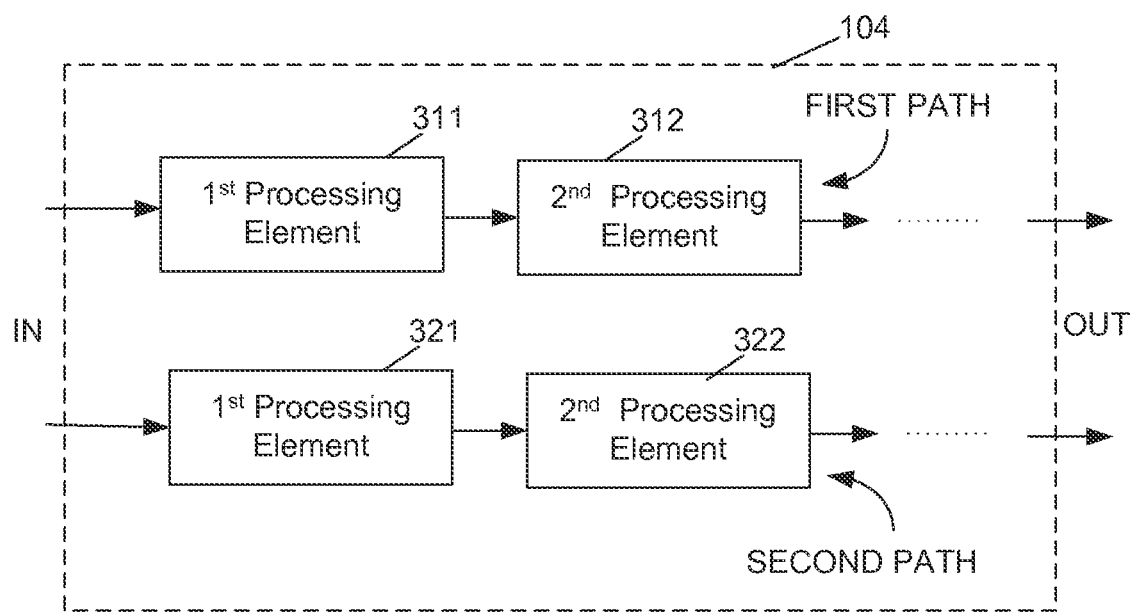

Referring next to FIG. 3, in one embodiment, the image signal processing pipeline performed by pipeline processing logic 104 contains parallel paths instead of a single linear path. For example, the parallel paths may provide a first path and a second path. Further, in one embodiment, the first path comprises a main processing path and the second path comprises a supplemental processing path. Therefore, while raw image data is being processed in the first path to generate a high-resolution image output suitable for storage, the raw image data is processed in the second and parallel path to generate a lower resolution image that can be generated more quickly (as compared to the first path) and be displayed in the camera viewfinder or display 106. It may be that the second path contains fewer stages or elements 321, 322 than the first path. Alternatively, the first path may contain the same number of or less number of stages or elements 311, 312 as compared to the second path. Further, the second path may involve resolution down-conversion of the image to lessen the amount of pixels that need to be processed during image processing, such as for image analysis, in the pipeline.

The benefits of the parallel paths may apply to still images as well as video images captured by the image sensor(s) 101 (FIG. 1). It is noted that some embodiments of the pipeline processing logic 104 utilizes a single image sensor 101 that provides raw data to the first and second paths, where the first path may process the raw data relatively carefully and more slowly than the second path that can generate an image available to be previewed more quickly.

Use of parallel paths in the image signal processing pipeline may enable processing of multiple image data simultaneously while maximizing final image quality. Additionally, each stage in the pipeline may begin processing as soon as image data is available so the entire image does not have to be received from the previous sensor or stage before processing is started.

Figure 4:
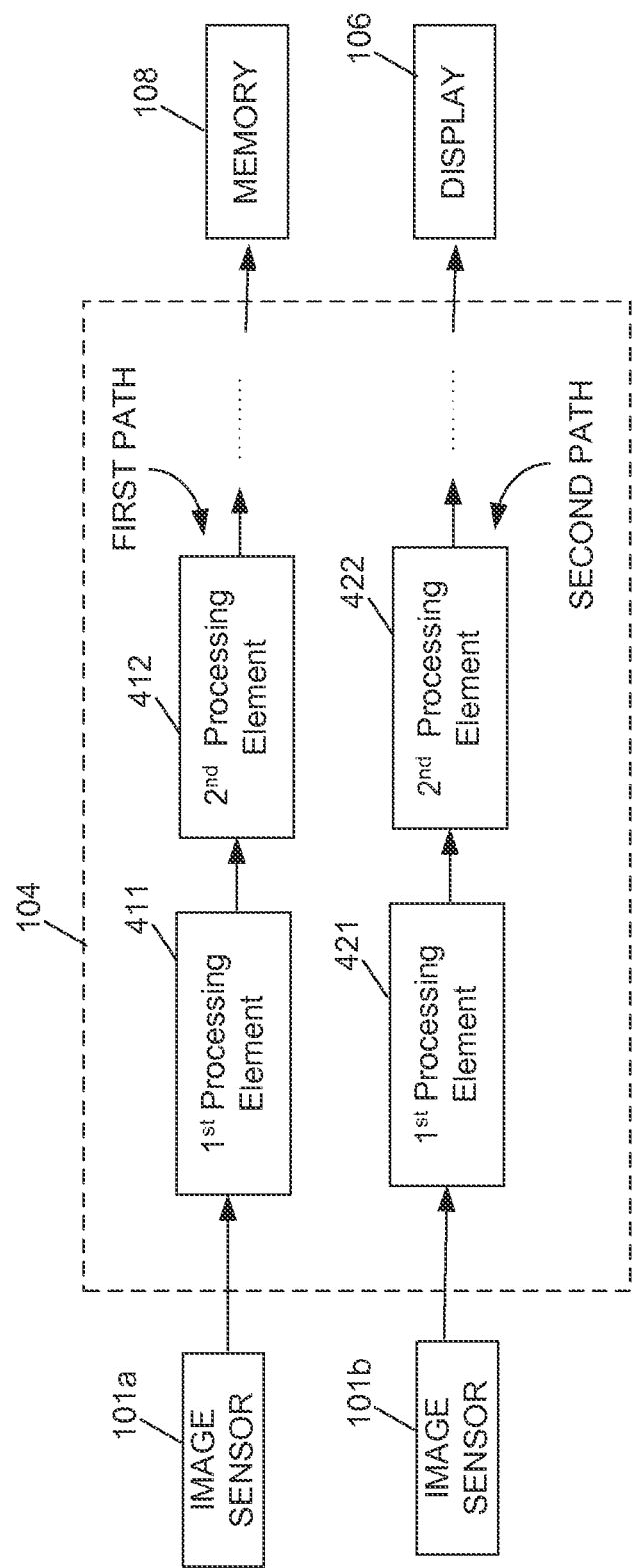

In an alternative embodiment, multiple imagers or image sensors 101 may be utilized, as shown in FIG. 4. For example, one imager or sensor 101a may provide raw data at a lower resolution than a second image sensor 101b, where the lower resolution raw data feeds a pipeline path to the display 106 and the higher resolution data feeds a path used for encoding and/or for storage in memory 108.

Further, in some embodiments, a secondary or supplemental image may be used in image analysis that can help subsequent image analysis operations for the main image. As an example, a secondary image at a smaller size or resolution than the main image might undergo facial recognition algorithms (or other object recognition algorithm) and output of positive results may be used to identify facial structures (or other objects) in the main image. Therefore, the secondary image may be produced in a format that is more suited for some of the applicable states or processing elements in its path. Accordingly, processing elements 411, 412, may be divided up between elements that are suited for the main image and processing elements 421, 422 that are suited for the secondary image. Accordingly, a secondary image may be initially processed, such as being made smaller or scaled, for the benefit of downstream elements. As an example, the path of the secondary image may contain a noise filtering element due to a downstream element needed for the secondary image to have undergone noise reduction. The different paths or elements in the different paths may also use different imaging formats. For example, one of the paths may use an integral image format whereas a standard image format is used in the other path. Accordingly, downstream elements in the integral image path may need an integral image format as opposed to a standard image format and vice versa.

In some embodiments, the images generated by the first and second paths may be stored in memory 108 and made available for subsequent use by other procedures and elements that follow. Accordingly, in one embodiment, while a main image is being processed in a main path of the pipeline, another image which might be downsized or scaled of that image or a previous image may be read by the main path. This may enable more powerful processing in the pipeline, such as during noise filtering.

For example, during noise filtering, for any given pixel being processed, neighboring pixels are analyzed. This process of denoising the pixel may have a stronger effect with the more pixels that are able to be analyzed further away from the pixel being processed. Due to hardware constraints, such as memory buffer size used by processing logic, there is a limit in how far away from the current pixel that the process can analyze neighboring pixels. Accordingly, in one embodiment, a downscaled version of the main image is generated in a second path and the noise filter in the main path reads the downscaled version of the image and stores those pixels for noise analysis. Since there are the same number of line buffers but the image is downscaled, this effectively allows the noise filter to see further away in the original image because the second image is at a reduced scale.

Accordingly, another embodiment utilizes a downscaled version of an image to assist in dynamic range optimization processing. By having available a downscaled version of an image alongside a full resolution image in memory 108, a dynamic range optimization process is provided a way to see further away from a current pixel than would be available by only considering the full resolution image. In a similar manner, a high dynamic range imaging process or element also reads a downscaled version of a main image to see further away from the current pixel.

Referring back to FIG. 1, in one embodiment, raw image data (from an image sensor 101) may be provided to the front-end processing logic 103 and processed on a pixel-by-pixel basis in a number of formats. For example, in one embodiment, raw pixel data received by the front-end processing logic 103 may be up-sampled for image processing purposes. In another embodiment, raw image or pixel data may be down-sampled or scaled. As will be appreciated, down-sampling of image data may reduce hardware size (e.g., area) and also reduce processing/computational complexity.

In some embodiments, the front-end processing logic 103 generates two distinct kinds of images for the pipeline processing logic 104. As an example, the imaging device 150 may be capturing video images and the user or the device itself determines to also capture a still image in addition to the video or moving images. A problem to overcome with this task in conventional cameras is that the video images are being generated at a resolution that is less than desired for still images. A potential solution would be to record the video images at the higher resolution desired for the still image, but this would require the pipeline processing logic 104 to undergo processing of the higher resolution video images. However, it is difficult to encode video at a high resolution (e.g., 8 megapixels) and it is also impractical, since video images do not necessarily require a very high resolution.

Accordingly, one embodiment of the present disclosure captures the raw image data by the sensor 101 at the higher resolution suitable for still image photography. Then, the front-end pipeline processing logic 103 scales down the size of the captured images to a resolution size suitable for video processing before feeding the image data to the appropriate pipeline processing logic 104. When the user or the imaging device 150 decides to capture an image still, for this one frame, the front-end pipeline processing logic 103 will receive instructions from the control logic 105 and store the desired frame in memory 108 at the higher resolution. Further, in one embodiment, although a main imaging path of the pipeline is handling the video processing, as processing time allows, the main imaging path can be provided the still image from memory 108.

Accordingly, in one embodiment, the video processing is assigned a higher priority than the still image processing by the pipeline processing logic 104. In such an embodiment, the pipeline processing logic 104 features a single pipeline for processing captured images but has the capability to multiplex the single pipeline between different input images. Therefore, the single pipeline may switch from processing an image or series of images having a high priority to an image or series of images having a lower priority as processing time allows.

Figure 5:
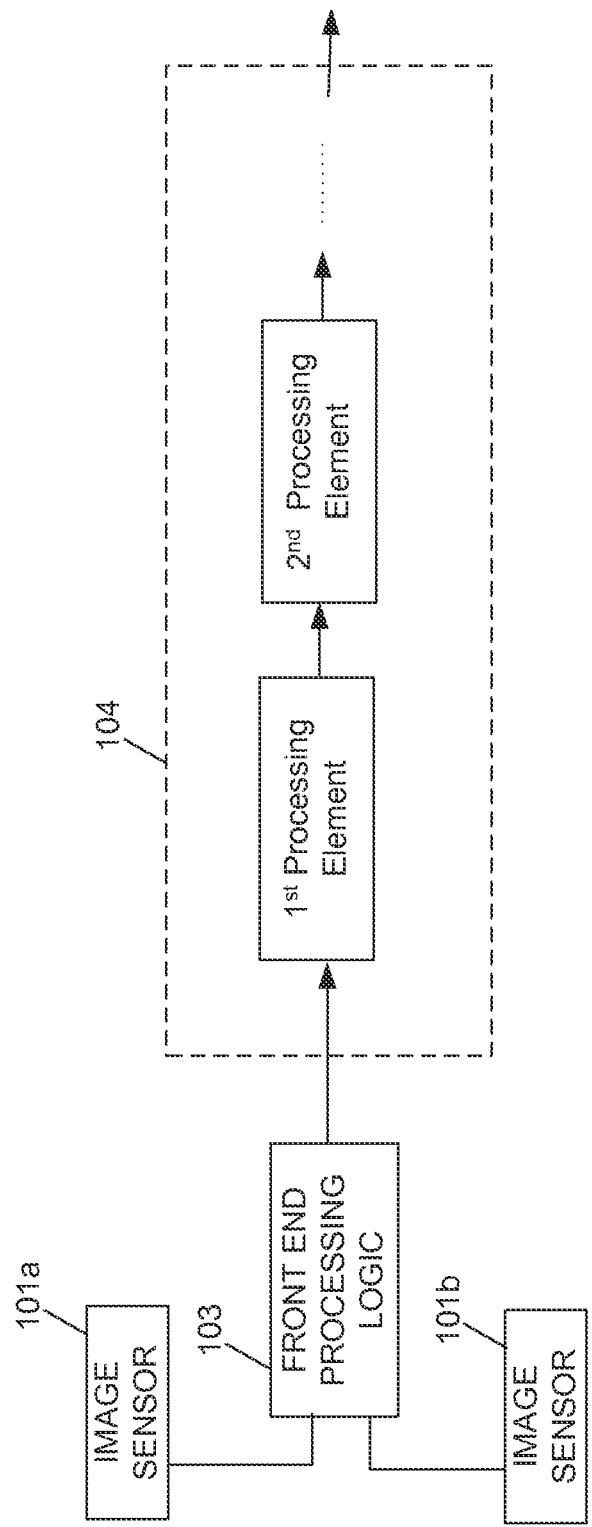

Multiplexing of the imaging pipeline is also implemented in an embodiment utilizing multiple image sensors 101. For example, consider a stereoscopic image device that delivers a left image and a right image of an object to a single image pipeline, as represented in FIG. 5. The single image pipeline in pipeline processing logic 104 can therefore be multiplexed between the left and right images that are being input in parallel to the image signal processing pipeline so that the pipeline is shared. Instead of processing one of the images in its entirety after the other has been processed in its entirety, the images can be processed concurrently by switching processing of the images between one another as processing time allows by front-end processing logic 103. This reduces latency by not delaying processing of an image until completion of the other image, and processing of the two images will finish more quickly.

Figure 6:
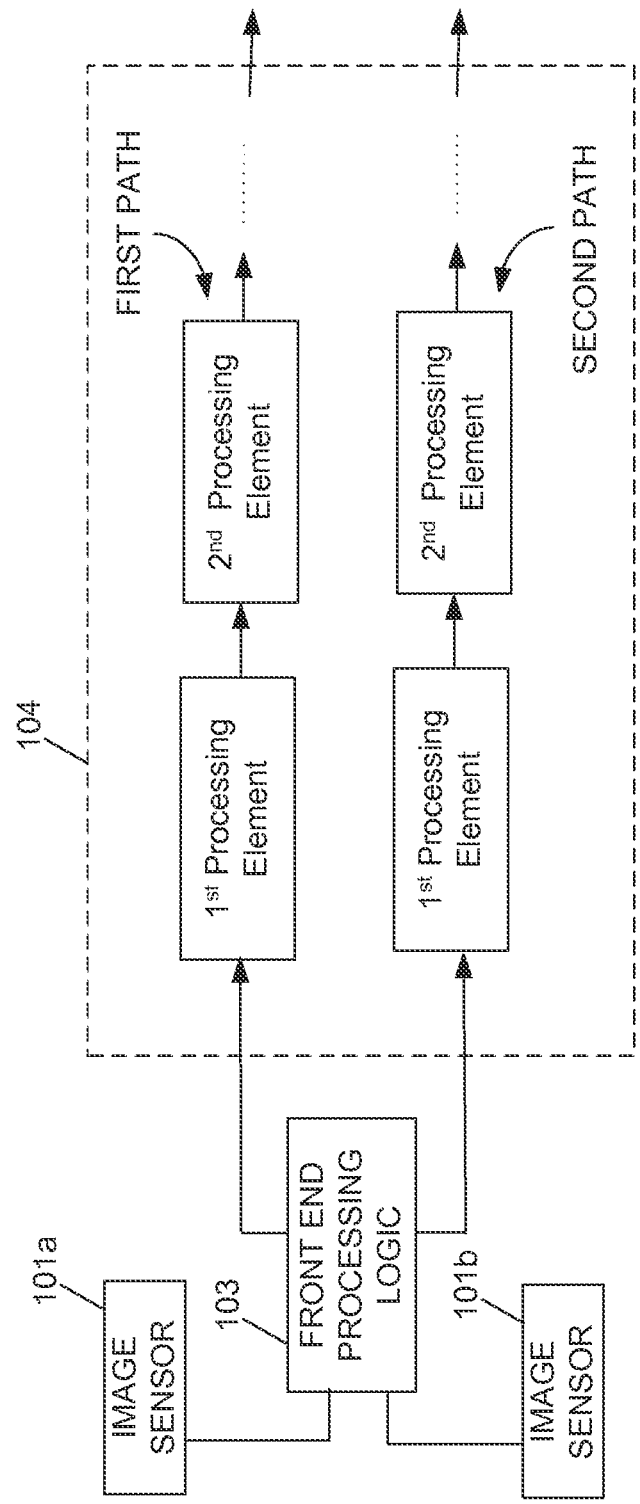

Alternatively, one embodiment utilizes multiple image sensors 101 that produce multiple inputs for the pipeline processing logic 104. Referring now to FIG. 6, in one scenario, one of the image sensors 101b may capture a low resolution image that is fed as a preview of an image recently captured, where the other image sensor 101a captures a high resolution image of the subject of the picture that is processed in parallel. Otherwise, the low resolution image may be used for framing a shot to be captured, where the subsequent captured shot or image is at a higher resolution and may undergo additional processing. Therefore, this embodiment features an imaging device with two fully parallel image capture and processing pipeline paths.

Figure 7:
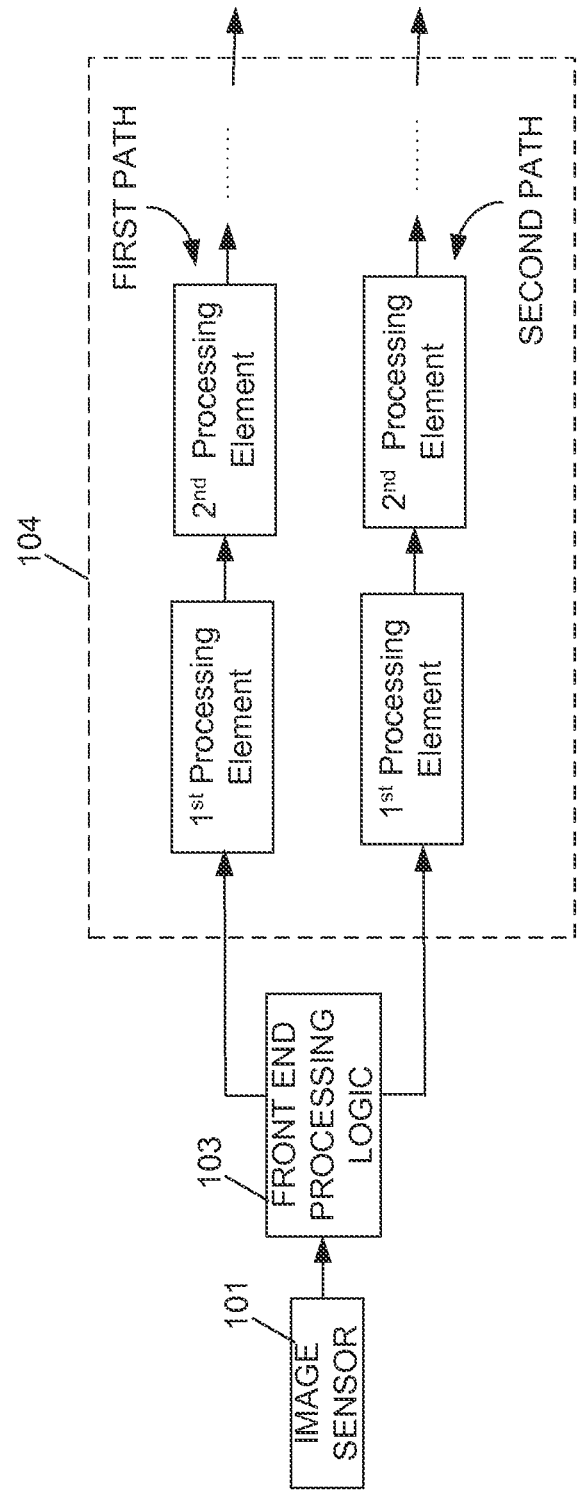

Further, in some embodiments, a single image sensor 101 is utilized to capture image information and provide the information to the front-end processing logic 103, whereby the front-end processing logic 103 may generate two input images for parallel paths in the pipeline processing logic 104 (as represented in FIG. 7). Also, in some embodiments, a single image sensor 101 is utilized to capture image information and provide the information to the front-end processing logic 103, whereby the front-end processing logic 103 may generate two input images for multiplexed input into a single path of the pipeline processing logic 104 (as represented in FIG. 6).

As referenced previously, for a given image, embodiments may transmit higher and lower resolution (or temporal, or quality) counterparts to expedite frame processing. In various stages of encoding and decoding processes, prediction between frames may be done on a macro block or on a pixel level, where a smaller resolution frame may have macro blocks that correspond to larger macro blocks in the higher resolution images. Further, individual pixels of differing images of the low resolution image may correspond to macro blocks of a higher resolution image. By passing along low resolution and high resolution images in parallel, the low resolution images may be used to predict the changes in macro blocks or average groups of images.

Figure 9:
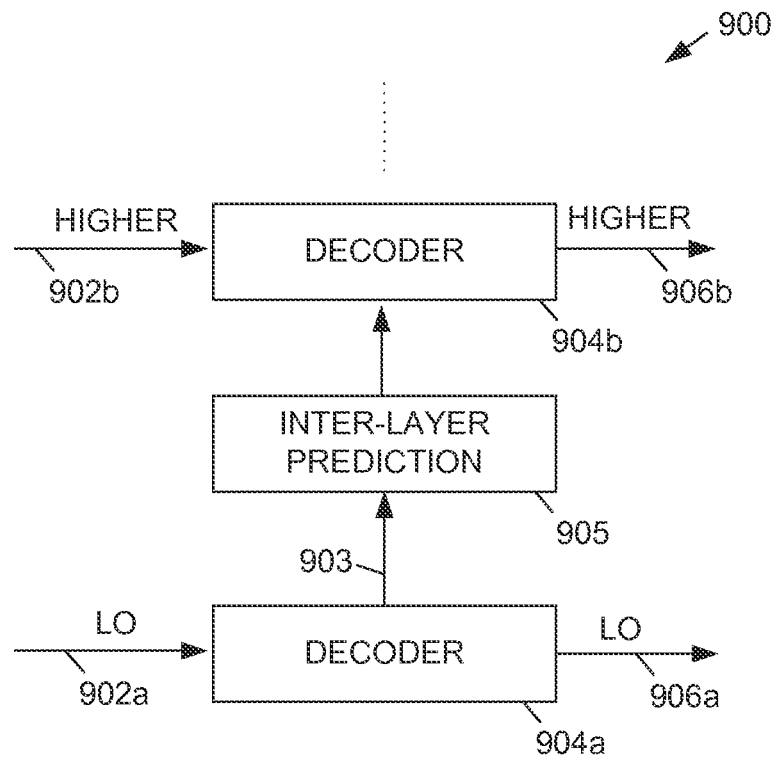

Referring to FIGS. 8 and 9, representations of embodiments of an encoder architecture 800 and decoder architecture 900, implemented by the pipeline processing logic from the image processing circuitry of FIG. 1, are presented. Referring to FIG. 8 and the represented encoder architecture 800, adaptable video architecture may provide for a scalable video pipeline. Video processing predicts the current frame content utilizing previous content from previous video frames. For example, H.264 uses this temporal coding for video processing. Other spatial and quality coding may also be used for video processing. Scalable video coding (SVC) is an extension of H.264 that uses video information at different resolutions to predict current frame content. SVC defines a plurality of subset bitstreams 802a, 802b, with each subset being independently decodable in a similar fashion as a single H.264 bitstream. Merely by dropping packets from the larger overall bitstream, a subset bitstream can be exposed. Each subset bitstream 802 can represent one or more of scalable resolution, frame rate, and quality video signal. More particularly, the subset bitstreams 802 represent video layers within SVC with the base layer 802a being fully compatible with H.264 (which is a single layer standard definition), in one embodiment. When the overall bitstream 806 is transmitted (e.g., by over air broadcast), a receiving device can use the appropriate subset bitstream to perform the video processing. The additional subset bitstream layers can be discarded or used to for temporal, spatial and/or signal quality improvements.

Accordingly, during encoding, a lower resolution image (e.g., 802a) may be generated to assist higher resolution encoding even though the resulting bitstream merely comprises the higher resolution version (e.g., 802b), while the lower resolution version (e.g., 802a) is purged or deleted, in one embodiment. The lower resolution version (e.g., 802a) may be generated on the fly by downscaling the higher resolution image (e.g., 802b), in one embodiment. Also, some embodiments may concurrently capture a lower resolution image (e.g., 802a) and a higher resolution image (e.g., 802b) using multiple image sensors 101.

Also, for transcoding, an encoded bitstream may be decoded and processed to create a lower resolution counterpart. Further, each of the resolution (or temporal, or quality) counterparts may be encoded (by one or more encoder portions 804a, 804b) for bitstream delivery or transmission to an end-point user device. In one embodiment, the encoded output 806 may comprise layers of the lower resolution/temporal/quality image sequences 802a and higher resolution/temporal/temporal/quality image sequences 802b of the same underlying media content.

Alternatively or in conjunction, one embodiment generates an encoded output 806 that comprises layers of lower resolution/temporal/quality image sequences 802a and higher resolution/temporal/quality image sequences 802b that are not derived from the same original source or not the same underlying media content. For example, two different image sequences may be captured concurrently from dual or multiple image sensors 101 and used as source material for the different layers 802.

Therefore, an embodiment of the adaptable video (transcode-encode-decode) architecture has at least two modes. First, the adaptable architecture 804a is instantiated once for H.264 decode or other single layer standard. Second, the adaptable architecture 804b is instantiated multiple times, each instance designed to accelerate the decoding of one SVC layer to improve the generated video image. For example, a lower resolution H.264 decode pipeline (M) may dump out internal aspects 803, which may then be read into next higher resolution layer (M+1). Information of values 803 may be tapped out such as, e.g., motion vectors, transform coefficients, and/or image data, prior to the application of a deblocking filter for use in the higher resolution pipeline. This may also be applied to multiple layers of progressively higher quality (and/or bitrate) at the same resolution or combined with different resolution layers. For example, a lower quality layer 804a (e.g., signal-to-noise ratio or fidelity) may dump out internal aspects 803, which may then be read into next higher quality layer 804b. The interlayer interpolations 805 (e.g., up sampling and/or filtering) may be performed externally by software modules executed by shared general-purpose processing resources of the video device, or by dedicated hardware.

Correspondingly, in some implementations, decoder architecture 900 (FIG. 9) may include a plurality of decode pipelines 904a, 904b with each decode pipeline being associated with a different resolution. The decode pipelines 904 may be implemented in hardware and/or software modules executed by general-purpose processing resources. Information 903 may be tapped out of a lower resolution decode pipeline (M) 904a, processed using an interlayer interpolation 905, and supplied to the next higher resolution decode pipeline (M+1) 904b for use. In other implementations, a single decode pipeline 904 may be used to perform the video processing at multiple resolutions. In this case, the decode pipeline performs the video processing at a first resolution (M) with information being extracted as appropriate. The decode pipeline may then performs the video processing at the next resolution (M+1) or at another higher resolution (e.g., M+2). Processing flow may be adjusted by sequencing the flow through the different decoding pipelines as appropriate.

Further, for a single bitstream 902b comprising a single layer, an embodiment of the decoder architecture 900 generates a lower resolution/temporal/quality counterpart 902a, on the fly, and thereafter uses the original and lower resolution/temporal/quality counterparts 902a, 902b in an SVC or SVC-like decoding process. Accordingly, in one embodiment, each of the components 904a, 904b of the decoder architecture 900 include the ability to insert or extract cross layer information supporting various layers of encoding.

For one embodiment, the structure of the decoder 904a, 904b is instantiated based upon the particular layers 902a, 902b being decoded. Each portion of the decoder architecture 900 may tap out data 903 that is used for decoding of differing layers of the multiple layer streams of images 902a, 902b. Prediction vectors or components from the lower layer decoding function 904a may be fed or inputted to the higher layer decoding functions 904b. Further, in one embodiment, interpolation in software 905 can be used to aid in the interpolation from particular components of one resolution or quality level to the next.

In some implementations, interlayer prediction vectors or components are not necessarily stored in memory 108, because these components may be passed between layers in hardware of the decoder architecture 900 (e.g., field programmable gate arrays, static random access memory (SRAM)-based programmable devices, etc.). Because the lower layers can work faster in the decoding process, the prediction coefficients can be obtained from a lower layer and passed to a higher layer for processing after the lower layer decoding is shut down to save processing resources in the lower layer. Accordingly, in some embodiments, inter-layer processing 905 is handled purely in hardware, without the memory bandwidth overhead of passing prediction information to synchronous dynamic random access memory (SDRAM) for software processing.

While the multiple decoded streams 906a, 906b may be used to separately feed different devices or one may be selected and the others purged, the various layers may also be transcoded, in some embodiments, after they have been successfully decoded.

Figure 10:
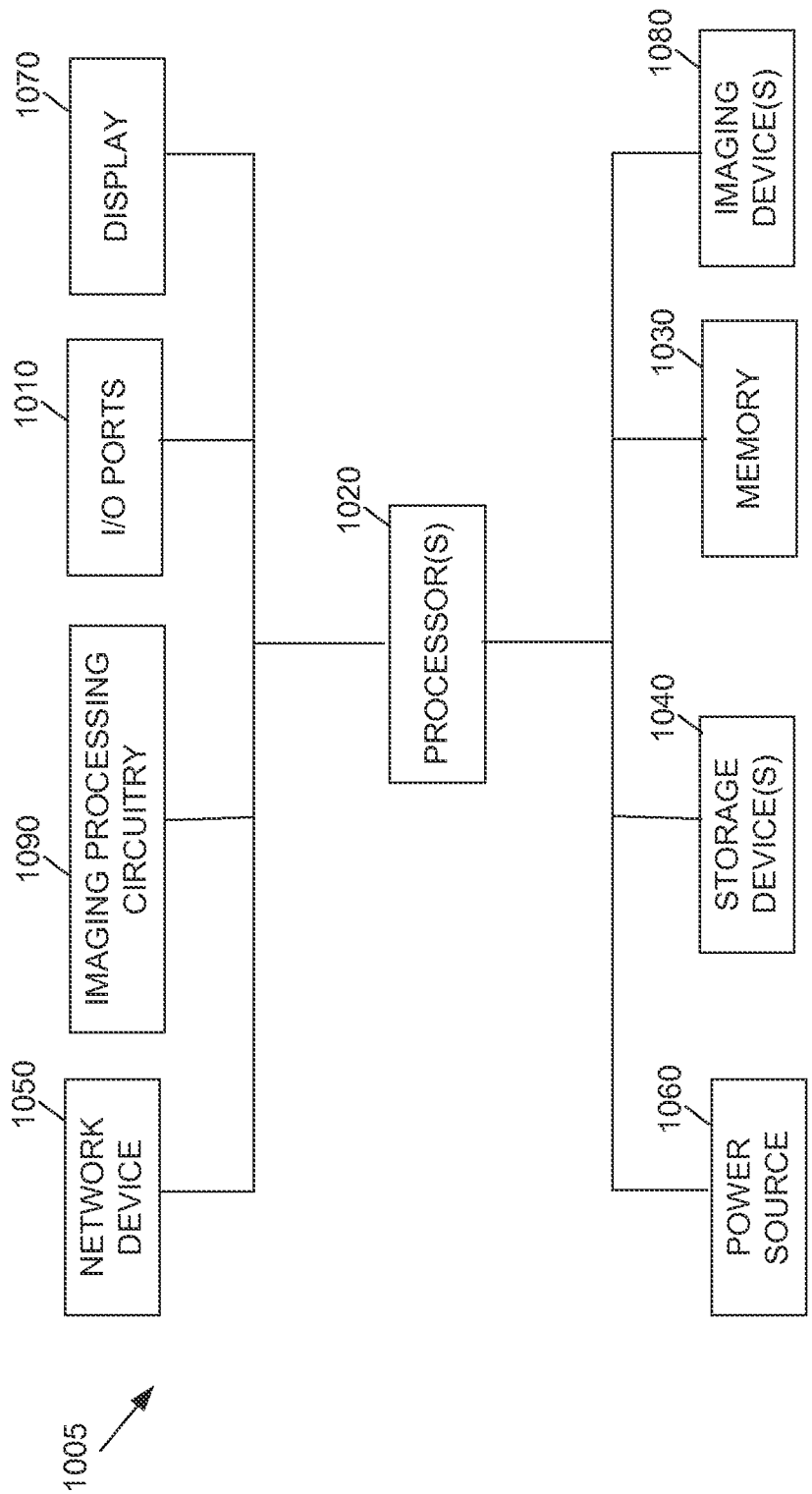
FIG. 10 is a block diagram illustrating an embodiment of an electronic device employing the image processing circuitry of FIG. 1.

Keeping the above points in mind, FIG. 10 is a block diagram illustrating an example of an electronic device 1005 that may provide for the processing of image data using one or more of the image processing techniques briefly mentioned above. The electronic device 1005 may be any type of electronic device, such as a laptop or desktop computer, a mobile phone, tablet, a digital media player, or the like, that is configured to receive and process image data, such as data acquired using one or more image sensing components.

Regardless of its form (e.g., portable or non-portable), it should be understood that the electronic device 1005 may provide for the processing of image data using one or more of the image processing techniques briefly discussed above, among others. In some embodiments, the electronic device 1005 may apply such image processing techniques to image data stored in a memory 1030 of the electronic device 1005. In further embodiments, the electronic device 1005 may include one or more imaging devices 1080, such as an integrated or external digital camera, configured to acquire image data, which may then be processed by the electronic device 1005 using one or more of the above-mentioned image processing techniques.

As shown in FIG. 10, the electronic device 1005 may include various internal and/or external components which contribute to the function of the device 1005. Those of ordinary skill in the art will appreciate that the various functional blocks shown in FIG. 10 may comprise hardware elements (including circuitry), software elements (including computer code stored on a computer readable medium) or a combination of both hardware and software elements. For example, in the presently illustrated embodiment, the electronic device 1005 may include input/output (I/O) ports 1010, one or more processors 1020, memory device 1030, non-volatile storage 1040, networking device 1050, power source 1060, and display 1070. Additionally, the electronic device 10 may include one or more imaging devices 1080, such as a digital camera, and image processing circuitry 1090. As will be discussed further below, the image processing circuitry 1090 may be configured implement one or more of the above-discussed image processing techniques when processing image data. As can be appreciated, image data processed by image processing circuitry 1090 may be retrieved from the memory 1030 and/or the non-volatile storage device(s) 1040, or may be acquired using the imaging device 1080.

Before continuing, it should be understood that the system block diagram of the device 1005 shown in FIG. 10 is intended to be a high-level control diagram depicting various components that may be included in such a device 1005. That is, the connection lines between each individual component shown in FIG. 1 may not necessarily represent paths or directions through which data flows or is transmitted between various components of the device 1005. Indeed, as discussed below, the depicted processor(s) 1020 may, in some embodiments, include multiple processors, such as a main processor (e.g., CPU), and dedicated image and/or video processors. In such embodiments, the processing of image data may be primarily handled by these dedicated processors, thus effectively offloading such tasks from a main processor (CPU).

Figure 11:
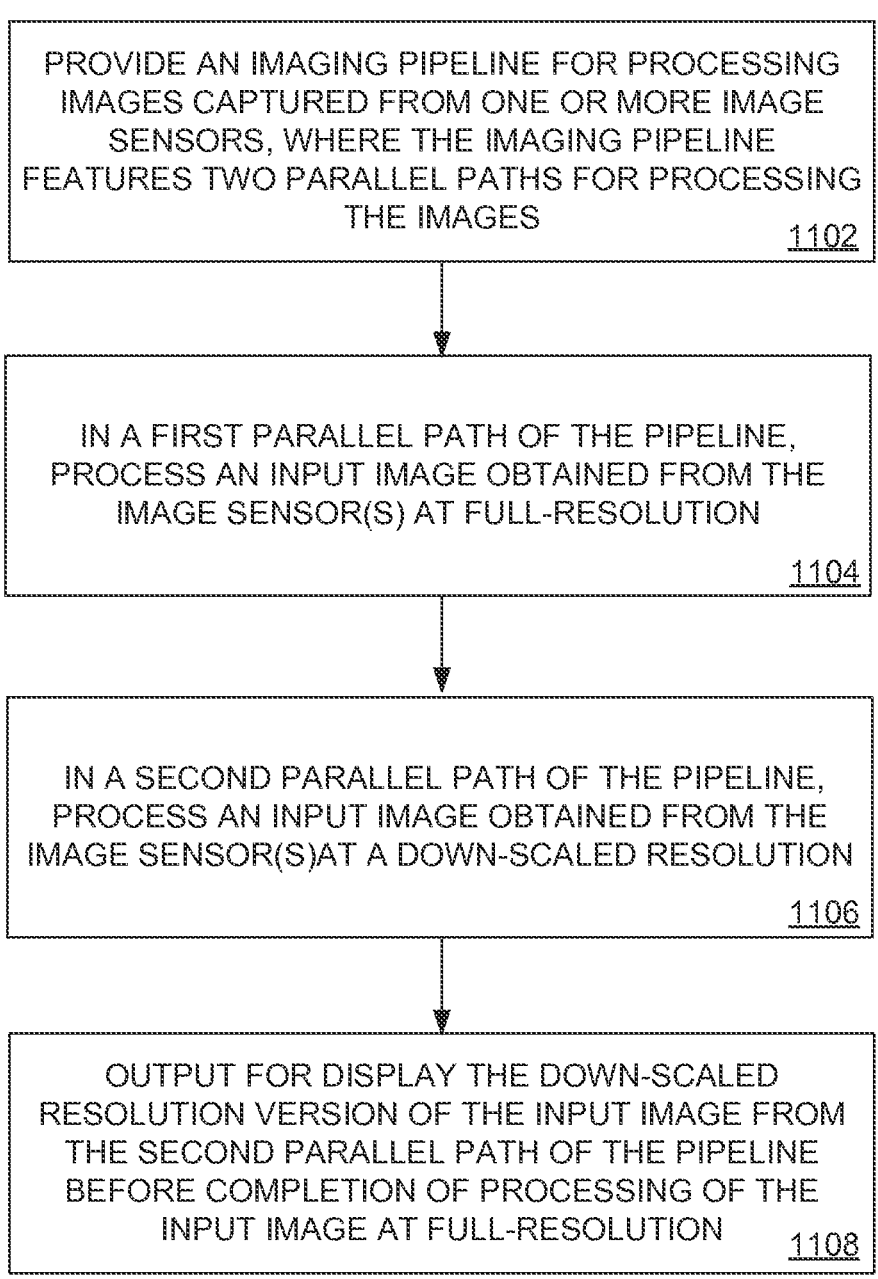
FIGS. 11-18 are flow chart diagrams depicting various functionalities of embodiments of image processing circuitry of FIG. 1.

Referring next to FIG. 11, shown is a flowchart that provides one example of the operation of a portion of the image processing circuitry 100 according to various embodiments. It is understood that the flowchart of FIG. 11 provides merely an example of the many different types of functional arrangements that may be employed to implement the operation of the portion of the image processing circuitry 100 as described herein. As an alternative, the flowchart of FIG. 11 may be viewed as depicting an example of steps of a method implemented in the electronic device 1005 (FIG. 10) according to one or more embodiments.

Beginning in step 1102, imaging processing circuitry 100 provides an imaging pipeline for processing images captured from one or more image sensors 101, where the imaging single processing pipeline features two parallel paths for processing the images. As described in step 1104, in a first parallel path of the pipeline, an input image obtained from the image sensor(s) 101 is processed at full-resolution. Additionally, in a second parallel path of the pipeline, an input image obtained from the image sensor(s) 101 is processed at a down-scaled resolution, as depicted in step 1106. The down-scaled resolution version of the input image is output from the second parallel path of the pipeline before completion of processing of the input image at full-resolution and is provided for display, in step 1108.

Figure 12:
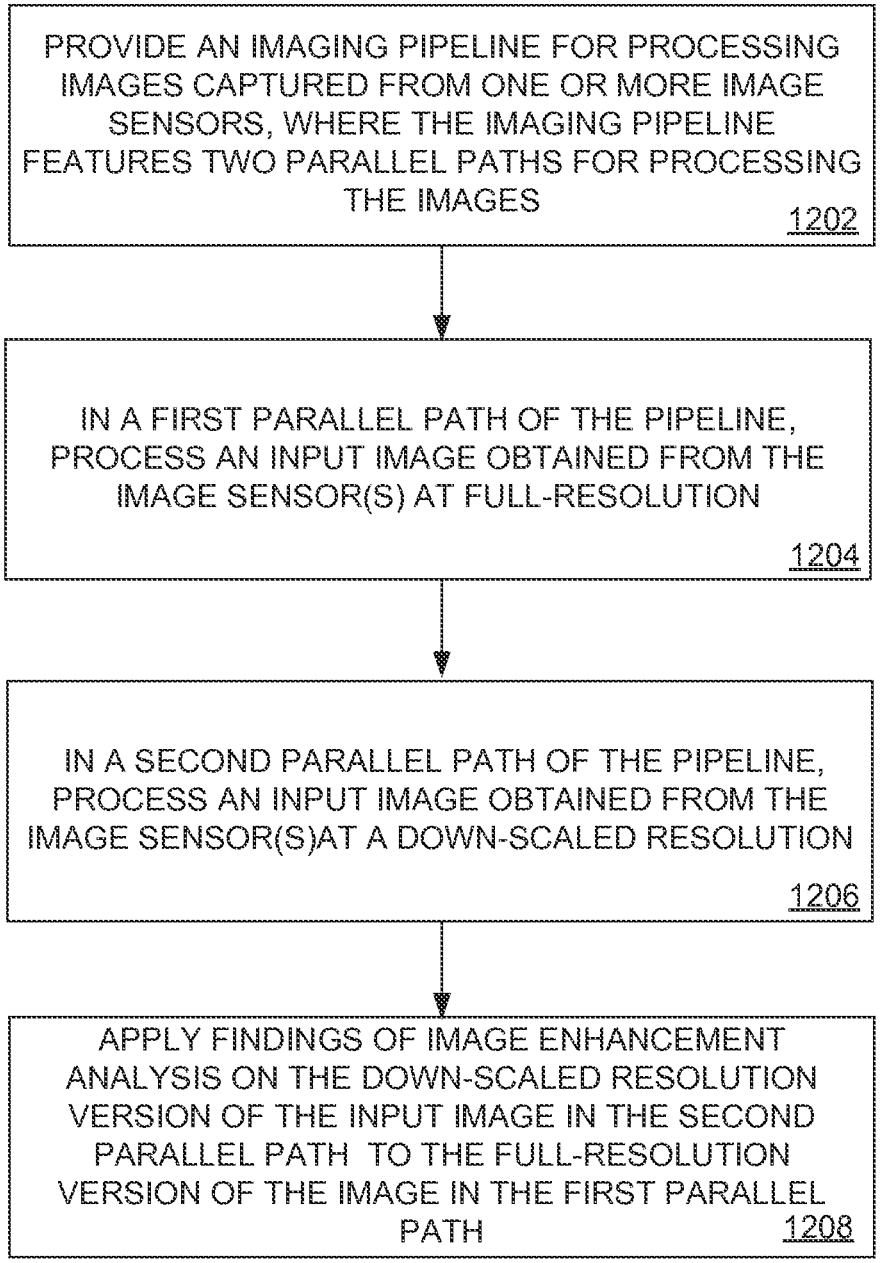

Next, referring to FIG. 12, shown is a flowchart that provides an additional example of the operation of a portion of the image processing circuitry 100 according to various embodiments. Beginning in step 1202, imaging processing circuitry 100 provides an imaging pipeline for processing images captured from one or more image sensors 101, where the image signal processing pipeline features two parallel paths for processing the images. As described in step 1204, in a first parallel path of the pipeline, an input image obtained from the image sensor(s) 101 is processed at full-resolution. Additionally, in a second parallel path of the pipeline, an input image obtained from the image sensor(s) 101 is processed at a down-scaled resolution, as depicted in step 1206. The down-scaled resolution version of the input image undergoes image enhancement analysis in the second parallel path that is applied to the full-resolution version of the image in the first parallel path, in step 1208. In particular, pixels are able to be analyzed in the down-scaled resolution version of the input image that may not be able to be analyzed as efficiently in the full-resolution version of the input image due to buffer limitations or other hardware restraints. In various embodiments, the type of image enhancement analysis may include noise filtering, dynamic range optimization, high dynamic range imaging, facial or object recognition, among others.

Figure 13:
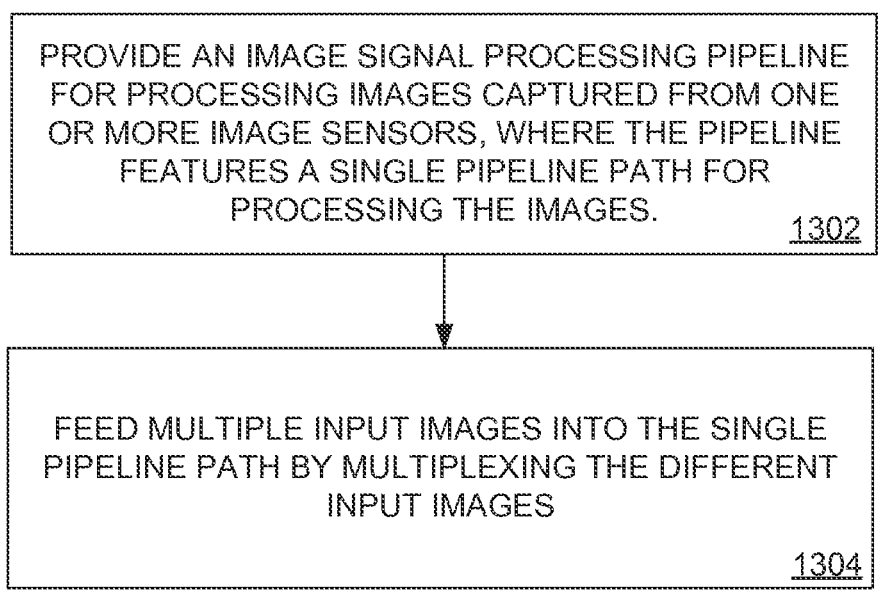

In FIG. 13, a flow chart is shown that provides an additional example of the operation of a portion of the image processing circuitry 100 according to various embodiments. Beginning in step 1302, imaging processing circuitry 100 provides an image signal processing pipeline for processing images captured from one or more image sensors 101, where the pipeline features a single pipeline path for processing the images. As described in step 1304, multiple input images may be fed into the single pipeline path by multiplexing the different images by front-end circuitry (e.g., front-end processing logic 103). For example, consider a stereoscopic image device that delivers a left image and a right image of an object to a single image pipeline, as represented in FIG. 5. The single image pipeline in pipeline processing logic 104 can therefore be multiplexed between the left and right images that are being input in parallel to the pipeline via the front-end circuitry. Instead of processing one of the images in its entirety after the other has been processed in its entirety, the images can be processed concurrently by switching processing of the images between one another as processing time allows by front-end processing circuitry.

Figure 14:
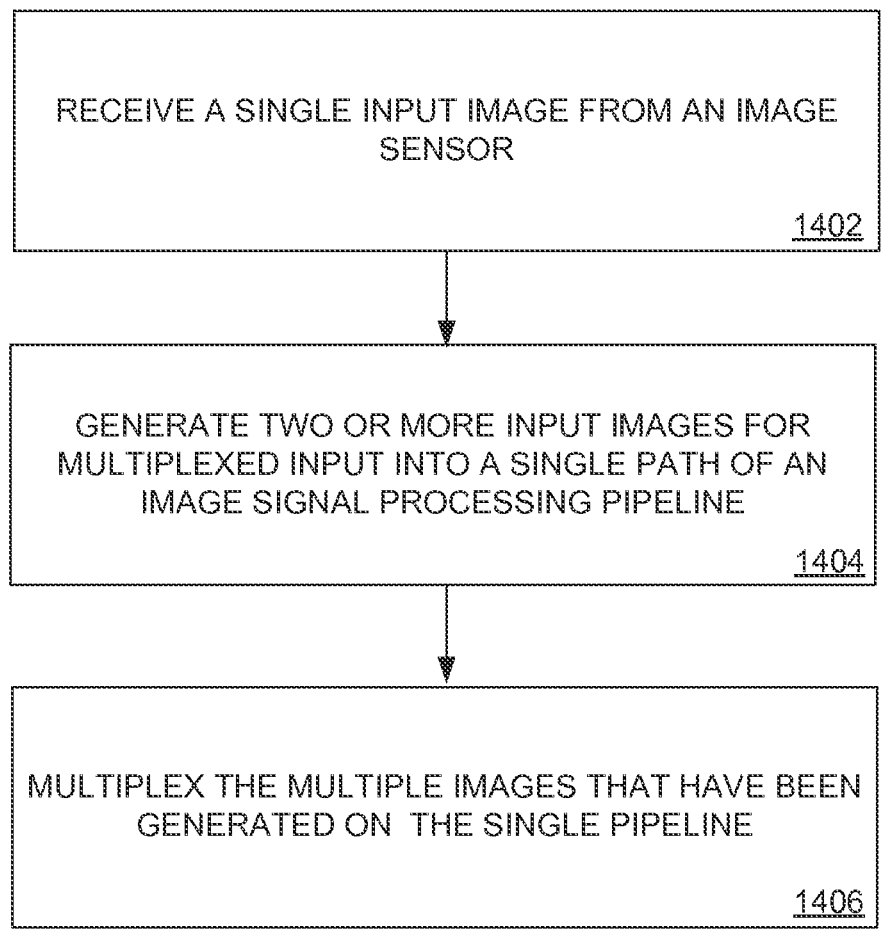

Further, in FIG. 14, a flow chart is shown that provides an additional example of the operation of a portion of the image processing circuitry 100 according to various embodiments. Beginning in step 1402, front-end processing circuitry can receive a single input image from an image sensor 101. In step 1404, the front-end processing circuitry may then generate two or more input images for multiplexed input into a single path of an image signal processing pipeline of pipeline processing logic 104 (as represented in FIG. 6). The single pipeline in pipeline processing logic 104 can therefore be multiplexed between the multiple images that have been generated by the front-end circuitry, in step 1406. Instead of processing one of the images in its entirety after the other has been processed in its entirety, the images can be processed concurrently by switching processing of the images between one another as processing time allows by front-end processing circuitry.

Figure 15:
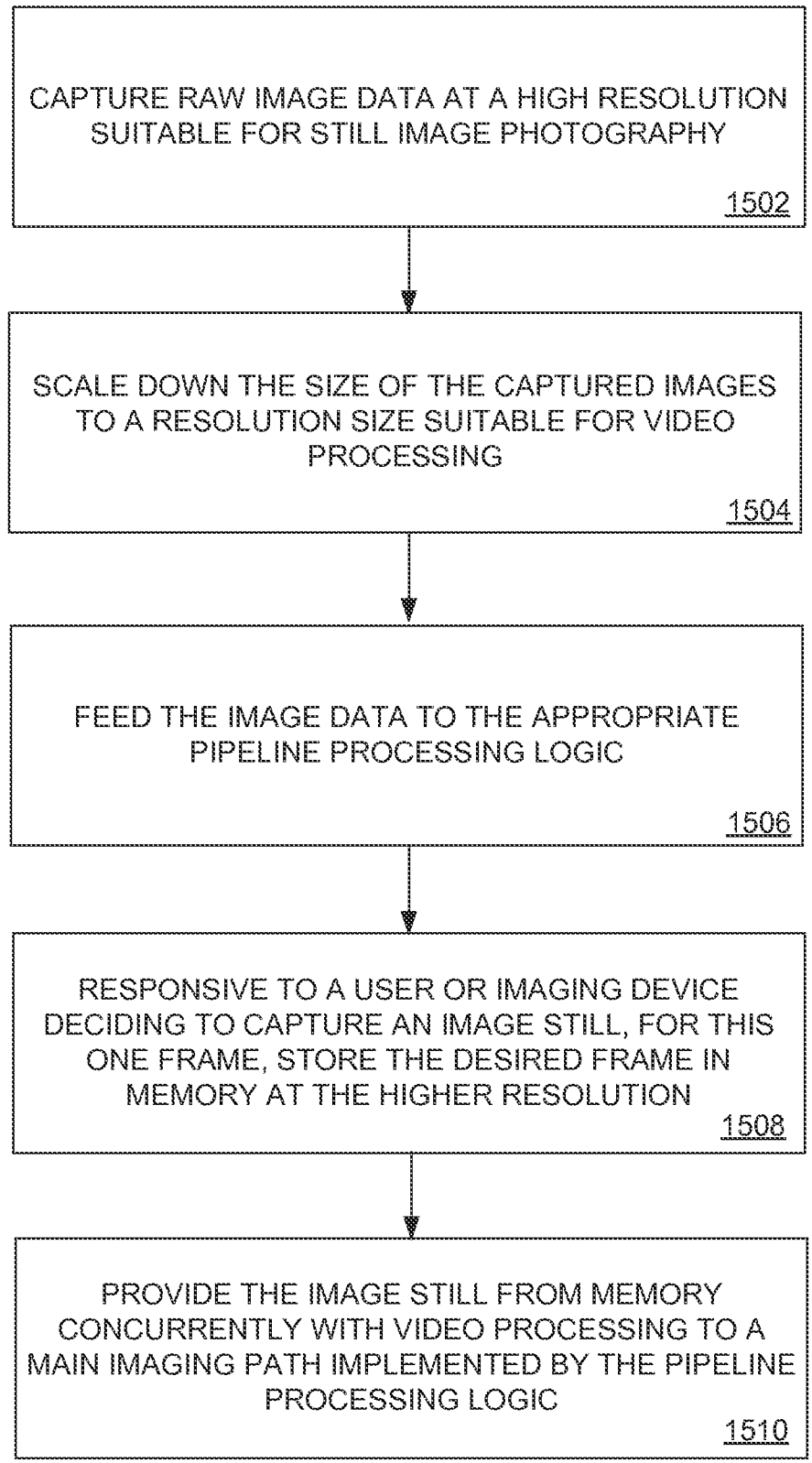

Next, in FIG. 15, a flow chart is shown that provides an additional example of the operation of a portion of the image processing circuitry 100 according to various embodiments. Accordingly, one embodiment of the present disclosure captures the raw image data by the sensor 101 at a high resolution suitable for still image photography, in step 1502. Then, the front-end pipeline processing logic 103 scales down the size of the captured images to a resolution size suitable for video processing, in step 1504, before feeding the image data to the appropriate pipeline processing logic 104, in step 1506. When the user or the imaging device 150 decides to capture an image still, for this one frame, the front-end pipeline processing logic 103 will receive instructions from the control logic 105 and store the desired frame in memory 108 at the higher resolution, in step 1508. Further, in one embodiment, although a main imaging path of the pipeline is handling the video processing, as processing time allows, the main imaging path can be provided the still image from memory 108, in step 1510.

Figure 16:
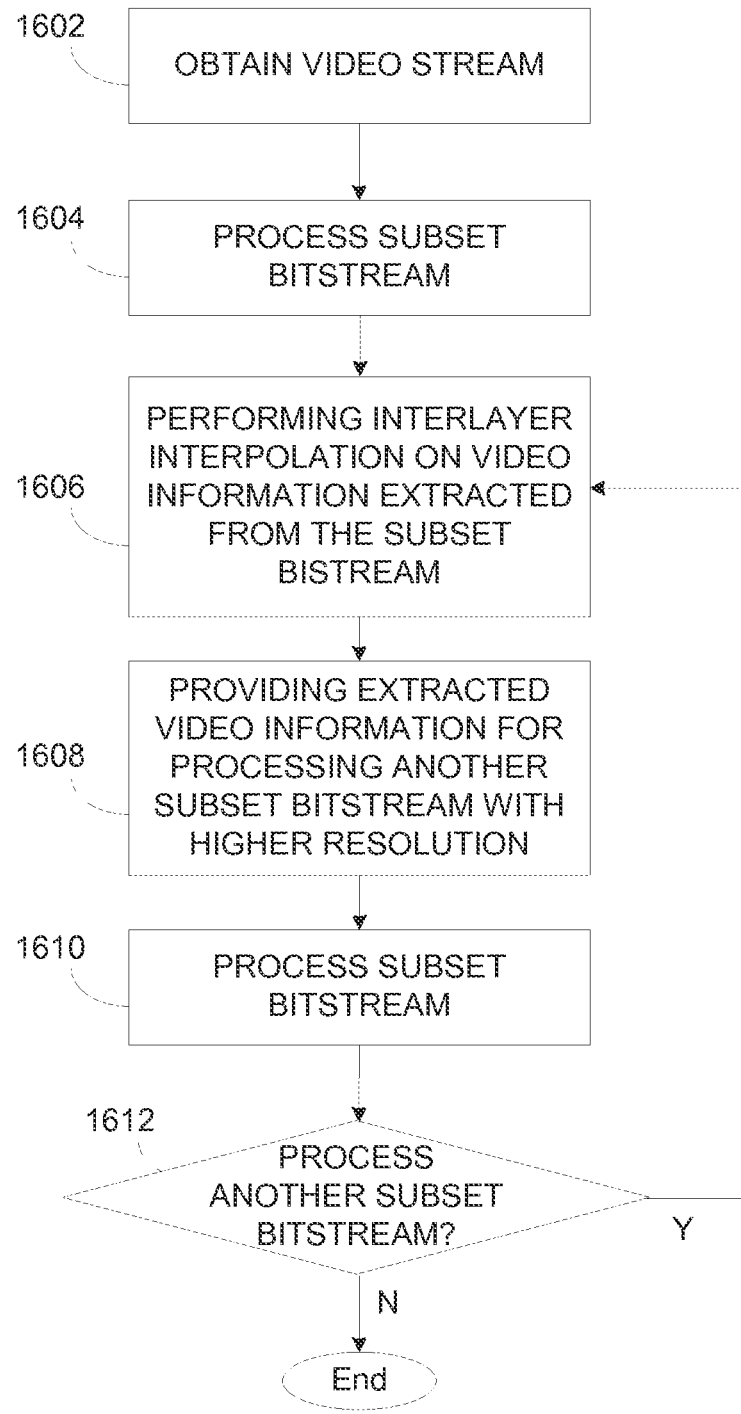

Referring now to FIG. 16, shown is a flow chart illustrating an example of scalable video pipeline processing. Beginning with step 1602, a first subset bitstream having a first resolution is obtained and processed in a video pipeline 804 of the video or imaging device 150, in step 1604. As discussed above, video information associated with the first subset bitstream is extracted (or tapped) from the video pipeline 804 during processing of the first subset bitstream. In step 1606, interlayer interpolation is performed on at least a portion of the extracted video information.

In step 1608, at least a portion of the extracted video data is provided to a video pipeline 804 of the video device 105 for processing (1610) of a second subset bitstream having a second resolution higher than the first resolution. In step 1612, if another higher resolution subset bitstream is to be processed, then the flow returns to step 1606, where interlayer interpolation is performed on at least a portion of the video information extracted during processing of the second subset bitstream. The flow continues until the processing of a higher subset bitstream ends at step 1612.

Figure 17:
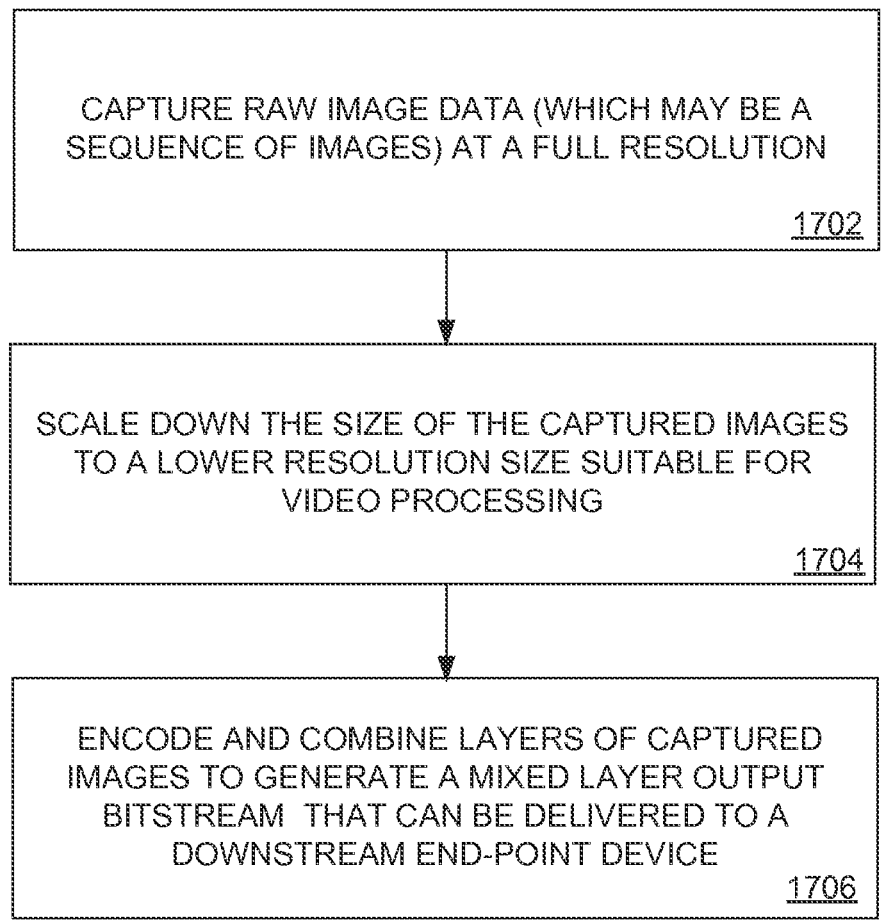

Next, in FIG. 17, a flow chart is shown that provides an additional example of the operation of a portion of the image processing circuitry 100 according to various embodiments. Accordingly, one embodiment of the present disclosure captures the raw image data (which may be a sequence of images) by an image sensor 101 at a full resolution, in step 1702. Then, the front-end pipeline processing logic 103 scales down the size of the captured images to a lower resolution size suitable for video processing by a downstream end-point device, in step 1704. Then, each layer of the input bitstream is encoded and combined to generate a mixed layer output bitstream (e.g., SVC bitstream) that can be delivered for an SVC or SVC-like decoding process to a downstream end-point device, in step 1706.

Figure 18:
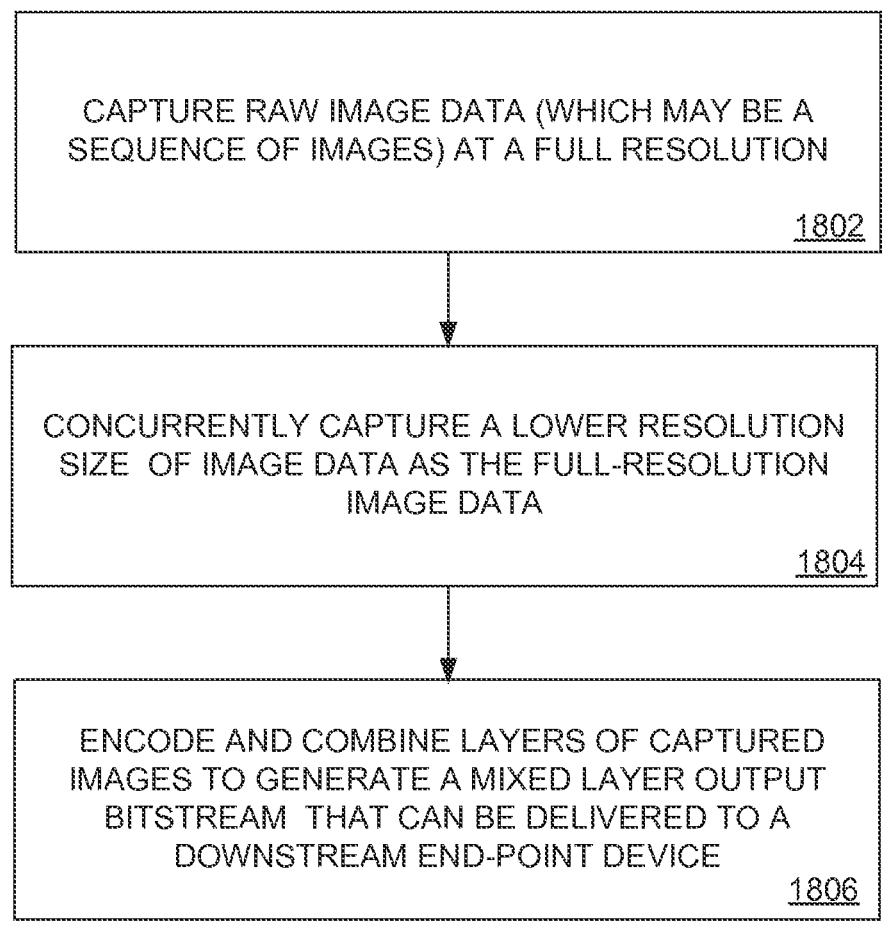

In FIG. 18, a flow chart is shown that provides an additional example of the operation of a portion of the image processing circuitry 100 according to various embodiments. Accordingly, one embodiment of the present disclosure captures the raw image data (which may be a sequence of images) by an image sensor 101 at a full resolution, in step 1802. Then, the front-end pipeline processing logic 103 obtains a lower resolution size of image data that is concurrently captured at the same time as the full-resolution image data, in step 1804. Accordingly, in step 1806, each layer of the input bitstream is encoded and combined to generate a mixed layer output bitstream (e.g., SVC bitstream) that can be delivered for an SVC or SVC-like decoding process to a downstream end-point device.

Any process descriptions or blocks in flow charts should be understood as representing modules, segments, or portions of code which include one or more executable instructions for implementing specific logical functions or steps in the process, and alternate implementations are included within the scope of embodiments of the present disclosure in which functions may be executed out of order from that shown or discussed, including substantially concurrently or in reverse order, depending on the functionality involved, as would be understood by those reasonably skilled in the art.

In the context of this document, a "computer readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). In addition, the scope of certain embodiments includes embodying the functionality of the embodiments in logic embodied in hardware or software-configured mediums.

It should be emphasized that the above-described embodiments are merely possible examples of implementations, merely set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, having thus described various embodiments, at least the following is claimed:

1. An image capture device, comprising:
a hardware processor; and
an image processing circuitry that concurrently receives first image data to be processed and second image data to be processed, wherein:
the second image data is processed to aid in enhancement of the first image data;
the image processing circuitry comprises an imaging pipeline for processing a plurality of image data captured from at least one image sensor;

the imaging pipeline features two parallel paths for processing the plurality of image data;

the first image data is processed at full-resolution on a first parallel path and the second image data is processed at a down-scaled resolution on a second parallel path; and the second parallel path comprises a hardware pipeline that extracts data used in decoding the first image data with the first parallel path, wherein the second parallel path is shut down after passing extracted data to the first parallel path without storing the extracted data in memory, wherein the first parallel path comprises a hardware pipeline.

2. The image capture device of claim 1, wherein the first image data comprises video.

3. The image capture device of claim 1, wherein the first image data is captured by a first image sensor of the image capture device and the second image data is captured by a second image sensor of the image capture device.

4. The image capture device of claim 1, further comprising:

a viewfinder display that displays output of the second image data from the image processing circuitry before completion of processing of the first image data by the image processing circuitry.

5. The image capture device of claim 1, wherein the enhancement of the first image data comprises at least one of noise filtering, dynamic range optimization, or high dynamic range imaging.

6. The image capture device of claim 1, wherein the second image data is generated during processing of the first image data.

7. The image capture device of claim 1, wherein the enhancement of the first image data comprises object or facial recognition.

8. The image capture device of claim 1, wherein an imaging format of the first imaging data is different from an imaging format of the second imaging data.

9. The image capture device of claim 1, wherein the at least one image sensor comprises:

a first image sensor that recorded the first image data; and
a second image sensor that recorded the second image data.

10. The image capture device of claim 1, wherein the image processing circuitry is operable to generate an output bitstream comprising encoded layers of the first image data and the second image data.

11. An image processing method, comprising:

receiving a first image data to be processed and a second image data to be concurrently processed; and
processing the second image data to aid in enhancement of the first image data, wherein:
the first image data and the second image data are processed in parallel pipeline paths, the first image data being processed at full-resolution on a first parallel path and the second image data being processed at a down-scaled resolution on a second parallel path;
the first parallel path comprises a hardware pipeline;
the second parallel path comprises a hardware pipeline that extracts data used in decoding the first image data with the first parallel path; and
the second parallel path is shut down after passing extracted data to the first parallel path without storing the extracted data in memory.

12. The image processing method of claim 11, wherein the first image data comprises video.

13. The image processing method of claim 12, further comprising:

displaying output of the second image data from the second parallel path before completion of processing of the first image data at the first parallel path.

14. The image processing method of claim 11, further comprising:

capturing the first image data with a first image sensor; and
concurrently capturing the second image data with a second image sensor.

15. The image processing method of claim 14, further comprising:

generating an output bitstream comprising encoded layers of the first image data and the second image data.

16. The image processing method of claim 11, wherein the enhancement of the first image data comprises at least one of noise filtering, and dynamic range optimization, or high dynamic range imaging.

17. The image processing method of claim 11, wherein the second image data is generated during processing of the first image data.

18. The image processing method of claim 11, wherein the enhancement of the first image data comprises object or facial recognition.

19. The image processing method of claim 11, wherein an imaging format of the first imaging data is different from an imaging format of the second imaging data.

20. An image processing method comprising:

capturing first image data with a first image sensor;
downscaling the first image data to produce second image data;
receiving the first image data to be processed and the second image data to be concurrently processed;
processing the second image data to aid in enhancement of the first image data,
wherein the first image data and the second image data are processed in parallel pipeline paths, wherein the first image data is processed at full-resolution on a first parallel path and the second image data is processed at a down-scaled resolution on a second parallel path,
wherein the first image data is processed and encoded using data extracted from processing of the second image data; and
deleting the second image data and extracted data after encoding the first image data.

21. The image processing method of claim 20, wherein the first image data comprises video.

22. The image processing method of claim 20, further comprising displaying an output of the second image data from the second parallel path before completion of processing of processing of the first image data at the first parallel path.

23. The image processing method of claim 20, wherein the enhancement of the first image data comprises at least one of noise filtering, and dynamic range optimization, or high dynamic range imaging.

24. The image processing method of claim 20, wherein the second image data is generated during processing of the first image data.

25. The image processing method of claim 20, wherein the second image data is not derived from a same original source as the first image data.

26. The image processing method of claim 20, wherein an imaging format of the first imaging data is different from an imaging format of the second imaging data.

* * * * *